United States Patent
Grando (10) Patent No.: US 9,925,748 B2
(45) Date of Patent: Mar. 27, 2018

(54) APPARATUS AND FACILITY FOR THE MANUFACTURE OF LAYERED SLATES AND RELATIVE METHOD

(75) Inventor: Loris Grando, Silea (IT)

(73) Assignee: LISEC AUSTRIA GMBH, Seitenstetten (AT)

( * ) Notice: Subject to any disclaimer, the term of this patent is extended or adjusted under 35 U.S.C. 154(b) by 318 days.

(21) Appl. No.: 13/700,598

(22) PCT Filed: May 25, 2011

(86) PCT No.: PCT/IB2011/052271
§ 371 (c)(1),
(2), (4) Date: Nov. 28, 2012

(87) PCT Pub. No.: WO2011/148322
PCT Pub. Date: Dec. 1, 2011

(65) Prior Publication Data
US 2013/0075034 A1    Mar. 28, 2013

(30) Foreign Application Priority Data
May 28, 2010  (IT) ............................... TV2010A0080

(51) Int. Cl.
*B32B 37/00* (2006.01)
*B32B 17/10* (2006.01)
(Continued)

(52) U.S. Cl.
CPC .... *B32B 37/0046* (2013.01); *B32B 17/10036* (2013.01); *B32B 17/1099* (2013.01);
(Continued)

(58) Field of Classification Search
CPC .................. B32B 17/1099; B32B 17/10036
See application file for complete search history.

(56) References Cited

U.S. PATENT DOCUMENTS 3,852,136 A * 12/1974 Plumat .............. B32B 17/10761
156/103
4,175,162 A * 11/1979 De Boel et al. .............. 428/428
(Continued)

FOREIGN PATENT DOCUMENTS

| DE | 202009014178 | 3/2010 |
|---|---|---|
| FR | 2599483 | 12/1987 |
| WO | 2008048464 | 4/2008 |

OTHER PUBLICATIONS

Machine translation of FR2599483.*
International Search Report dated Oct. 27, 2011, from corresponding International Application No. PCT/IB2011/052271.

*Primary Examiner* — Christopher T Schatz
(74) *Attorney, Agent, or Firm* — Katten Muchin Rosenman LLP (57) ABSTRACT

The invention relates to an oven (10) for the production of stratified sheets (12) from pre-assembled sheets (14). The pre-assembled sheets (14) comprise at least two sheets (16, 18) and at least one sheet of polymer material (20). The oven (10) comprises a hot chamber (22) which in turn comprises heating means (26) and an inlet opening (28) provided with first closing means (30). The oven also comprises a cold chamber (24) communicating with the hot chamber (22) and able to be separated from the hot chamber (22 via separation means (23). The cold chamber comprises cooling means (36) and an outlet opening (42) provided with second closing means (44). The invention also relates to a method for the production of stratified sheets.

9 Claims, 5 Drawing Sheets

(51) Int. Cl.
*B32B 39/00* (2006.01)
*B32B 37/06* (2006.01)
*B32B 37/08* (2006.01)

(52) U.S. Cl.
CPC .. *B32B 17/10743* (2013.01); *B32B 17/10761* (2013.01); *B32B 17/10788* (2013.01); *B32B 17/10871* (2013.01); *B32B 17/10954* (2013.01); *B32B 39/00* (2013.01); *B32B 37/06* (2013.01); *B32B 37/08* (2013.01)

(56) References Cited

U.S. PATENT DOCUMENTS

| | | | |
|---|---|---|---|
| 4,910,088 A * | 3/1990 | Baudin et al. | 428/432 |
| 6,342,116 B1 * | 1/2002 | Balduin et al. | 156/106 |
| 7,435,375 B1 * | 10/2008 | Johnston et al. | 266/252 |
| 2001/0007270 A1 | 7/2001 | Balduin et al. | |

* cited by examiner

APPARATUS AND FACILITY FOR THE MANUFACTURE OF LAYERED SLATES AND RELATIVE METHOD

The present invention relates to an apparatus, a plant and a method for the production of stratified sheets.

The stratified sheets comprise generally at least two sheets with a core of polymer material arranged between them. The sheets may be made for example of stone material, stone-like material, glass, PET, polycarbonate or also photovoltaic cells. As is well known, the stratified sheet may be composed of sheets of the same type or different type depending on the specific requirements.

The present invention will refer in particular to stratified sheets of glass, commonly called laminated-glass sheets, it being understood that it is possible for the invention to be applied also to the abovementioned materials which however do not constitute an exhaustive list of the possible materials which can be used and which are moreover well-known.

Laminated glass is a product which is particularly popular in various applications which require particular safety, structural and aesthetic features. It in fact combines optimum mechanical properties with resistance to atmospheric agents and with ease of manufacture of particular forms.

The method for the production of laminated glass envisages combining two or more sheets of glass by means of a polymer core, in particular ionomer core, arranged between them Generally, the core of polymer material may consist of a sheet of polyvinyl butyral (PVB), ethylene vinyl acetate (EVA), or SentryGlas® marketed by DuPont™. These materials, as is well known, under the combined action of heat and pressure, can be used to obtain bonding of two sheets of glass between which they are arranged, forming a single sheet of laminated glass.

The number of sheets of glass, and therefore sheets of polymer material arranged between them, may vary, resulting in a vast range of products having thicknesses also of considerable size.

As mentioned above, the lamination process which will be described below is applicable not only to the bonding of sheets of glass, but is applicable also to the bonding of other types of materials.

Below a plant of the known type for the production of laminated glass will be described.

Generally a plant for the production of laminated glass comprises essentially a stratification line and an autoclave.

The stratification line has the function of pre-laminating the glass sheets with the arrangement of a sheet of polymer material in between and comprises: a washing zone, an assembly zone and a pre-lamination zone.

In the washing zone, the sheets of glass are washed with water and brushed to eliminate the presence of any residual matter which could adversely affect adhesion between the surface of the glass sheet and the corresponding surface of the polymer material. Subsequently the sheets of glass are dried, in a manner known per se.

In the assembly zone, the sheets of glass are assembled, with the arrangement in between them of a sheet of polymer material. Assembly is normally performed in automated fashion with the aid of mechanical manipulators of the known type. The polymer material is usually provided in sheet or roll form. In the case where it is supplied in roll form, storage is more efficient than storage in sheet form and employment thereof is quicker since the rolls may be mounted on an unwinding device.

The unwinding device allows unwinding of the polymer material and positioning on top of a first sheet of glass. Then the manipulator positions a second sheet of glass on top of the sheet of polymer material. This method may be repeated several times until the desired number of layers is obtained.

The polymer material which is commonly used, i.e. PVB, must be kept at certain humidity and temperature values so that its properties and therefore the effectiveness of the bond is not affected.

Since the positioning operation requires the sheets of glass to have a high degree of surface cleanliness and the polymer material to be kept at given temperature and humidity values, the assembly zone is usually provided inside an air-conditioned room.

The assembly consisting of the sheets of glass with the sheets of polymer material arranged between is transferred to the pre-lamination zone where, following a heating and pressing action, the sheets of glass and the sheets of polymer material assume a pre-laminated condition. During this step an initial bond between the sheets and the polymer material is achieved so that the intermediate product thus obtained may be moved prior to the actual lamination step.

Heating of the sheet, to a temperature of about 70-80° C., is generally performed inside an oven provided with infrared lamps. These ovens may also be provided with forced-air convection systems.

After the heating step the sheets, with the sheet of polymer material arranged in between, pass between two rolling rolls arranged at a predetermined distance from each other. These rolls may be lined so as to improve their wear-resistance.

As is well known, the pre-lamination step, in addition to having the function of pre-assembling the sheets of glass with the arrangement of polymer material in between, also has the function of expelling the air which could remain trapped between the surfaces of the glass sheets and the sheet of polymer material.

Usually, the pre-laminated glass sheets, upon leaving the pre-lamination zone, are temporarily kept in a store, pending the production of a quantity suitable for forming a load big enough to be introduced into an autoclave, where the final part of the lamination process is performed.

The quantity of sheets which form a load suitable for insertion inside the autoclave (about 6-7 tonnes) essentially depends on two factors:

the power consumption of the autoclave for each processing cycle; and the production requirements.

The high power consumption of the autoclave is due to the high pressure values (about 13 bar) and temperature (about 180° C.). The temperature and pressure values indicated refer to the cycle operating parameters, for example to the parameters used when the sheet of polymer material consists for example of PVB.

These parameters may increase significantly during the autoclave test operations where, for example, the pressure may increase up to 20 bar.

It is evident, therefore, that, owing to the high pressure and temperature values reached inside it, the autoclave is considered to be the critical part of the laminated-glass production plant. Owing to the considerable structural stresses affecting it, the structure of the apparatus must be designed so as to be correspondingly bigger and its state of wear must be periodically checked.

Particularly important also are the dimensions of the autoclave which, being decidedly large, result in the need for large spaces and prevent easy transfer thereof between different production sites.

The power consumption of the autoclave is high and reaches values of about 400 kW, obliging the company to install a dedicated electrical substation.

In view of all these considerations, the autoclave, even though economically advantageous in the case where large load volumes are processed, is subject to drawbacks relating to the maintenance of adequate safety standards and the provision of a suitable production site.

Moreover, the duration of processing of a single load in the autoclave is very long, usually about 6 hours, and prevents in fact the continuous production of laminated glass. In fact, in the case of the consecutive production of several batches of materials, it is necessary to take into account the transient time periods due also to heating and cooling of the internal structure of the autoclave.

For these reasons use of the autoclave is advantageous only for large laminated-glass manufacturers, while it is not advantageous for small and medium-size manufacturers who however constitute the majority of laminated-glass manufacturers.

The patent of industrial invention IT 1220547, in the name of Attilio Borgna, entitled "Method for the manufacture of stratified glass" describes a method for the production of laminated glass which partially solves the problems relating to the aforementioned plants. The plant described in IT 1220547 does not make use of the autoclave which is instead replaced by an oven inside which the material to be processed is heated at a constant pressure lower than the cycle pressure inside the autoclave.

In particular, the method envisages a pre-lamination step which may be performed in two ways:

a first mode substantially similar to that described further above; and a second mode which, after heating, envisages insertion of the sheets of glass with the sheet of polymer material arranged in between, inside a bag inside which the vacuum is created.

It is evident that the vacuum effect tends to move the two sheets of glass towards each other, compressing the sheet of polymer material located between them.

Then the sheets contained inside the vacuum bag are inserted inside an oven, the temperature of which is gradually increased to 140-150° C. This temperature is maintained for a given period of time, at the end of which air cooling is performed. This method results in the production of laminated-glass sheets which have the same mechanical and aesthetic properties as a laminated-glass sheet obtained in a plant comprising the autoclave, partially solving the problems associated with use thereof.

However the method according to the document IT 1220547 is also not without drawbacks.

Firstly, since the temperature varies progressively up to 140-150° C., the time required to heat the load depends both on the sheet and on the internal structure of the oven which must also reach a temperature of about 140-150° C. Since the total thermal inertia is the sum of the inertia of the load and the inertia of the internal structure of the oven, heating to the operating temperature takes a long time which conditions the duration of the entire production cycle. Moreover it is necessary to calculate the energy wastage due to heating and cooling of the oven structure, to be attributed to each individual load.

Secondly, lowering of the temperature of the laminated-glass sheets is obtained by extracting them from the oven and leaving them to cool in air. It can therefore be understood that the cooling step is not controlled and depends on many factors which are such that the processing conditions are not reproducible.

The problems associated with the movement of the hot load which has just been processed within the production site are also evident, this potentially involving serious risks for the safety of the operators working on said site.

The object of the present invention is therefore to solve at least partially the drawbacks of the laminated-glass production plants of the known type.

A first task of the present invention is to provide an apparatus for the production of laminated-glass sheets from pre-laminated sheets, which overcomes at least partly the drawbacks of the autoclave and ovens of the known type.

A second task of the present invention is to provide a plant for the production of laminated-glass sheets which overcomes at least partly the drawbacks of the prior art.

A third task of the present invention is to provide a plant which is suitable for the production of small and medium quantities of stratified sheets.

A further task of the present invention is to provide a method for the production of laminated-glass sheets which solves at least partly the drawbacks of the prior art.

The abovementioned object and tasks are achieved by a device according to claim 1, by a method according to claim 13 and by a plant according to claim 18.

The further advantages and characteristic features of the present invention will become clear from the detailed description which follows of a number of examples of embodiment, provided by way of a non-limiting illustration, with reference to the accompanying drawings in which.

In the accompanying figures, the reference number 10 denotes an oven for the production of stratified sheets according to the invention.

Figure 1:
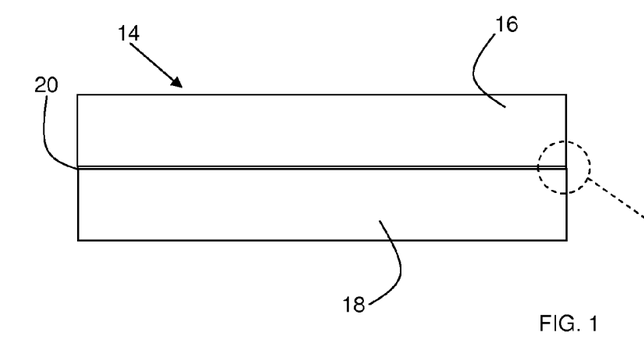
FIG. 1 shows a schematic view of a pre-assembled sheet of glass.
Figure 1A:
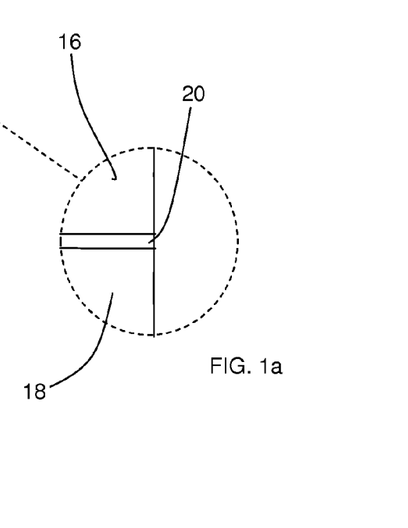
FIG. 1a shows a detail of the pre-assembled sheet of glass according to FIG. 1.
Figure 2:
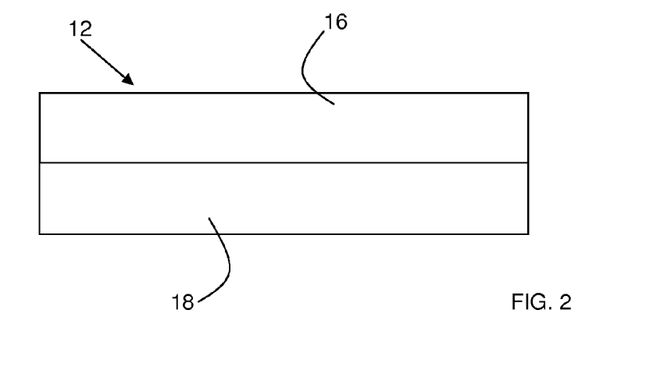
FIG. 2 shows a schematic view of a laminated sheet of glass.

The oven 10 which will now be described is suitable for the production of stratified sheets 12 from pre-assembled sheets 14 shown in FIGS. 2 and 1, respectively.

Pre-assembled sheets 14 are understood as meaning sheets 16 and 18 with a sheet of polymer material 20 arranged between them, which may or may not have undergone a pre-lamination process of the type described above.

From hereon reference will be made to a pre-assembled sheet consisting of two sheets 16 and 18 with a polymer sheet 20, for example PVB, arranged in between, it being understood however that:

a) the present invention is applicable also to the production of stratified sheets comprising (n) sheets, with (n−1) sheets of polymer material arranged between them;

b) the reference to PVB as a material forming the sheet of polymer material 20 does not have a limiting scope, but is purely exemplary, since the present invention is also applicable to other materials, for example ethylene vinyl acetate (EVA) or SentryGlas® marketed by the company DuPont™. Each of these materials may be used, in a manner known per se, in order to satisfy specific requirements.

Figure 3:
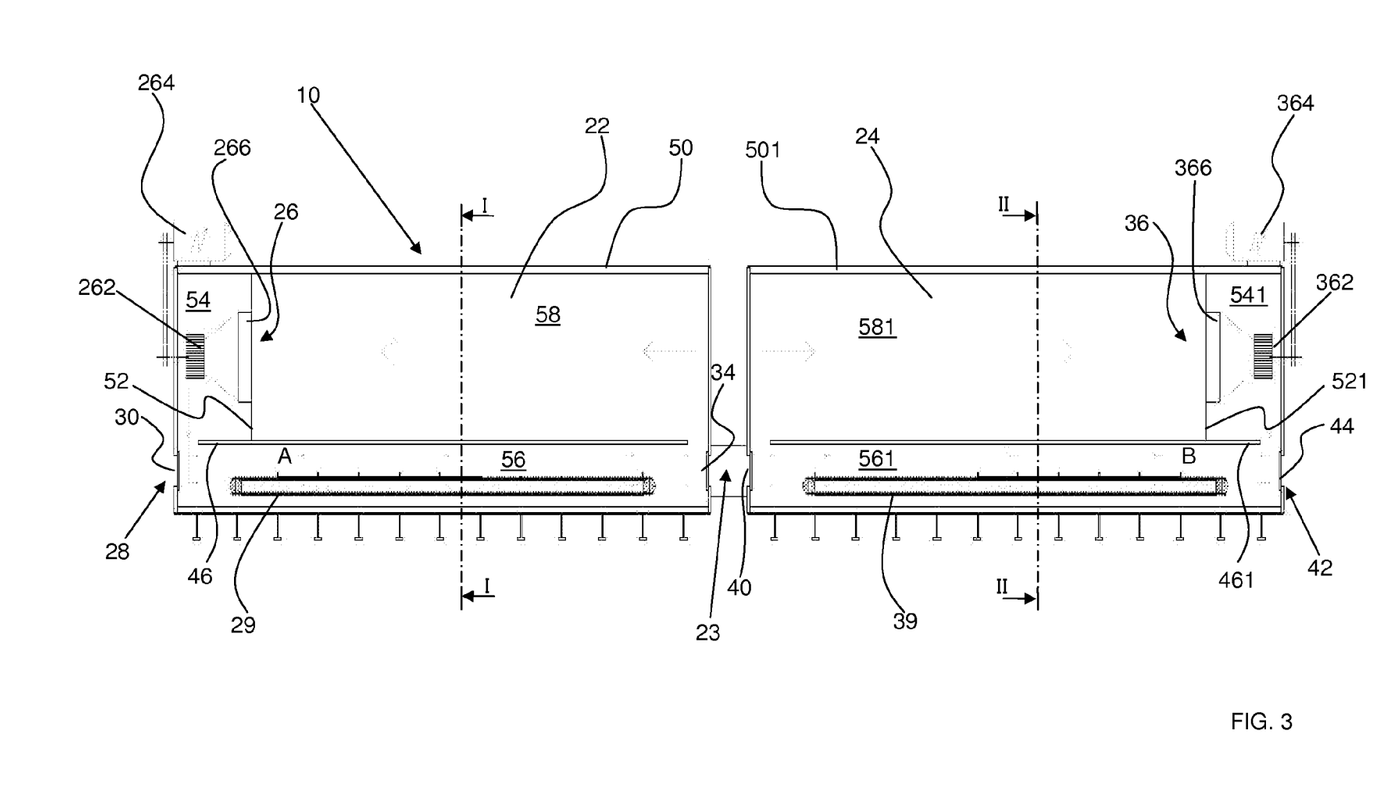
FIG. 3 shows, in schematic form, an oven for the production of laminated-glass sheets from pre-laminated glass sheets, according to the present invention.

The oven 10 according to the present invention comprises a hot chamber 22 which in turn comprises:

heating means 26; and an inlet opening 28 provided with first closing means 30.

Moreover the oven 10 according to the present invention comprises a cold chamber 24 in communication with the hot chamber 22. The cold chamber 24 comprises:

cooling means 36; and an outlet opening 42 provided with second closing means 44.

The cold chamber 24 can be separated from the hot chamber via separation means 23 comprising at least one gate 34, 40.

The detailed description which follows is provided taking into account sheets 16 and 18 of glass, although this reference is not intended to be limiting as specified further above.

Figure 4:
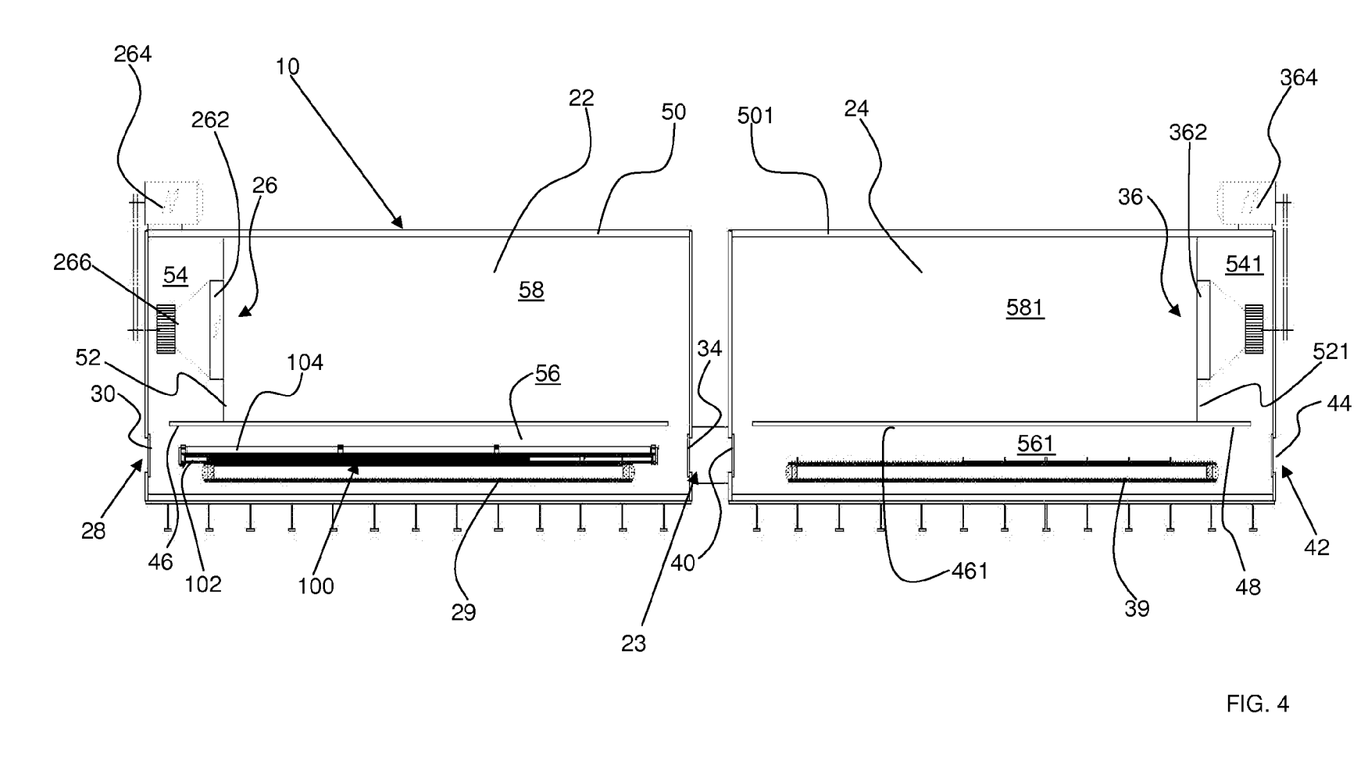
FIG. 4 shows, in schematic form, the oven for the production of laminated-glass sheets according to FIG. 3 with inside a load.

A load 100 entering the hot chamber 22, as shown in FIG. 4, comprises pre-assembled sheets of glass 104 arranged horizontally. In one possible embodiment, the load 100 also comprises a shelf or tray 102 on which the sheets 104 are arranged.

The hot chamber 22 comprises an outer structure 50 with, formed therein, the inlet opening 28 for introducing the load 100, where the first closing means consisting of a shutter 30 are arranged. The shutter 30 may be operated manually or by means of an automatic movement system, for example in the case where the production cycle is managed via automated means.

The outer structure 50 defines an inner space divided into three compartments 54, 56 and 58 which are in fluid communication with each other. Said compartments 54, 56 and 58 are obtained by dividing up the inner space of the hot chamber 22 by means of a dividing wall 52 extending mainly vertically and a guide wall 46 extending mainly horizontally and therefore substantially parallel to the lie of the load 100 and substantially perpendicular to the dividing wall 52. The function of the three compartments 54, 56 and 58 is described in greater detail below.

The hot chamber 22 may comprise a conveyor belt 29 which lies substantially horizontally and on which the load 100 is positioned. In particular, the pre-assembled sheets 104, in accordance with an alternative embodiment of the present invention, may be positioned directly in contact with the conveyor belt 29 without the use of the shelf 102.

The conveyor belt 29 performs both the function of moving the load 100 into and out of the hot chamber 22 and the function of supporting the load 100 during the heating cycle.

In a manner known per se, the conveyor belt 29 may be replaced by a chain conveyor (not shown) or other means suitable for the purpose.

A forced-air flow is provided inside the hot chamber 22. This forced-air flow is produced by means of a fan 266 located on the dividing wall 52 between an input compartment 54 and a return compartment 58. In an alternative embodiment of the present invention the forced-air flow may be obtained by means of other devices in a manner known per se.

The input compartment 54 is located close to the inlet opening 28 and, inside it, heating of the air flowing inside the hot chamber 22 takes place. The fan 266, which is driven by an electric motor 264, forces the air to pass through the heating means 26 comprising for example a finned electrical-resistor unit 262.

Upon leaving the finned unit 262, the hot air flows into the vicinity of the shutter 30 and, moving substantially in a direction parallel to the lie of the load 100 (direction indicated by A in FIG. 3), reaches the heating compartment 56 where the load 100 is situated.

In alternative embodiments different heating means of the known type, such as a gas unit or diathermic-oil unit (not shown), may be used.

The heating means 26 are suitable for increasing the temperature inside the hot chamber 22 to values for example of between 100 and 160° C.

Upon leaving the heating compartment 56 the air flow reaches the return compartment 58 situated substantially above the heating compartment 56 and divided from the latter by the guide wall 46.

The air, which is recalled by the action of the fan 266, reaches the dividing wall 52 and then the input compartment 54.

The hot chamber 22 is provided with means comprising for example a compressor (not shown) suitable for increasing the pressure inside it to values of between, for example, 0.4 and 3 bar above atmospheric pressure.

The hot chamber 22 has a structure suitable for maintaining a pressure value inside it. In particular, the first closing means 30 are suitable for maintaining the pressures values inside the hot chamber 22.

The separation means 23, which comprise at least one gate 34, 40 are designed to isolate the hot chamber 22 from the cold chamber 24.

According to one possible embodiment of the present invention the separation means comprise two gates 34, 40 which are positioned adjacent and in succession with each other. In particular a first gate 34 is provided on a wall of the hot chamber 22, while a second gate 40 is provided on a wall of the cold chamber 24. An intermediate chamber 23 is arranged between hot chamber 22 and cold chamber 24, said intermediate chamber communicating on one side with the first gate 34 and on the other side with the second gate 40.

The gates 34, 40 are able to maintain a pressure value inside the hot chamber 22 and the cold chamber 24, respectively, and may be operated manually or automatically.

The cold chamber 24 comprises an outer structure 501 provided with the separation means 23 and in particular the second gate 40 via which the load 100 is introduced.

The outer structure 501 of the cold chamber 24 defines an inner space divided into three compartments 541, 561 and 581 which are in fluid communication with each other. Said compartments 541, 561 and 581 are obtained by dividing up the inner space of the hot chamber 24 by means of a dividing wall 521 extending mainly vertically and a guide wall 461 extending mainly horizontally and therefore substantially parallel to the lie of the load 100 and substantially perpendicular to the dividing wall 521.

The cold chamber 24 may comprise a conveyor belt 39 which lies substantially horizontally and on which the load 100 is positioned. The conveyor belt 39 performs both the function of moving the load 100 into and out of the cold chamber 24 and the function of supporting the load 100 during processing.

In a manner known per se, the conveyor belt 39 may be replaced by a chain conveyor (not shown) or other means suitable for the purpose.

A forced-air flow is provided inside the cold chamber 24, said air flow being produced by means of a fan 366 located on the dividing wall 521 between an input compartment 541 and a return compartment 581. In an alternative embodiment of the present invention the forced-air flow may be obtained by means of other devices in a manner known per se.

The input compartment 541 is located close to the outlet opening 42 and, inside it, cooling of the air flowing inside the cold chamber 24 takes place. The fan 366 forces the air to pass through inside a finned unit 362. In one possible embodiment the fan 366 is driven by an electric motor 364. The finned unit may be supplied with tower water or, alternatively, may be supplied with ethylene glycol. Alternatively a chiller may be provided in a manner known per se.

At the output of the finned unit 362, the cold air flows into the vicinity of the shutter 44 and reaches the cooling compartment 561 where the load 100 is situated, moving substantially in a direction parallel to the lie of the load 100, in the direction indicated by B in FIG. 3.

Upon leaving the cooling compartment 561 the air flow reaches the return compartment 581 situated substantially above the cooling compartment 561 and divided from the latter by the guide wall 461.

The air, which is recalled by the action of the fan 362, reaches the dividing wall 521 and then the input compartment 541.

The cold chamber 24, similar to the hot chamber 22, is provided with means suitable for increasing the pressure internally, comprising for example a compressor (not shown). These pressure values may range, for example, between 0.4 and 3 bar above atmospheric pressure.

Moreover, the cold chamber 24 has a structure suitable for maintaining a pressure value inside it. In particular, the second closing means 44 are suitable for maintaining the pressures values inside the cold chamber 24.

According to a possible embodiment of the oven 10, devices (not shown) may be provided for controlling the temperature of the load 100 inside the hot chamber 22 and the cold chamber 24. These devices may be used, in a known manner, for continuous adjustment of the heating and cooling cycle.

In accordance with a possible embodiment of the oven 10 according to the present invention, a system for automated loading and unloading of the load 100 entering and leaving the oven 10 may be provided.

The operating principle of the oven 10 according to the present invention will now be described in detail.

The method for production of stratified sheets by means of an oven 10 according to the present invention, from a load 100 comprising pre-assembled sheets 104, comprises the following steps:

heating the load 100 to a given temperature depending on the type of polymer material which forms the sheet of polymer material 20, in the presence of a pressure of between 0.4 and 3 bar above atmospheric pressure;
maintaining the temperature for a given period of time in the presence of a pressure of between 0.4 and 3 bar above atmospheric pressure;
transferring the load 100 to the cold chamber; and
controlled cooling of the load 100 to a given temperature depending on the type of polymer material which forms the sheet of polymer material 20.

The detailed description of the method according to the present invention is provided with reference to the application of sheets of glass, but this reference is not intended to be limiting in nature.

The load 100 comprising the pre-assembled sheets of glass 12 enters into the oven 10 via the inlet opening 28 of the hot chamber 22.

When the load 100 is in the vicinity of the inlet opening 28 of the previously heated hot chamber 22, the gate 30 opens, as described above, and the load 100 is arranged with its end above the first conveyor belt 29 which allows feeding of the load 100 inside the hot chamber 22.

The hot chamber 22 of the oven 10 has been brought to the operating temperature beforehand by means of the heating means 26 comprising, for example, the finned unit 262 and the fan 266, in the manner described previously.

When the load 100 is in position, the shutter 30 of the hot chamber 22 is closed.

The load 100 is then heated to a given temperature depending on the type of polymer material which forms the sheet of polymer material 20, in the presence of a pressure of between 0.4 and 3 bar above atmospheric pressure.

The load 100 is heated to a temperature for example in the range of 100-160° C. The duration of the initial heating step depends, in a manner known per, on various factors such as the thickness of the sheet, the weight, the type of sheet and the type of polymer material used. For example, in the case of a glass sheet load of about 800 kg with a thickness of about 30 mm, the initial heating step may have a duration of about 20-40 minutes.

Preferably, in the case of glass, the load 100 is heated to a temperature in the range of 135-155° C.

Subsequently, this temperature is maintained, in the presence of the same pressure, for a given period of time which in this case also is dependent on the parameters mentioned above for the heating step.

With reference to the example indicated further above the temperature is maintained for a period of 15-20 minutes.

The present parameters relate in particular to PVB, but may also vary depending on the type of polymer material used.

During heating and maintaining of the aforementioned temperature condition, the pressure inside the hot chamber 22 is kept at a constant value of between 0.4 and 3 bar above atmospheric pressure by the aforementioned means which comprise, for example, a compressor (not shown).

At the end of processing inside the hot chamber 22, the load 100 is transferred to the intermediate chamber 23 by means of the first conveyor belt 29.

Opening of the separation means 23 comprising at least one gate 34, 40 is then performed.

According to a possible embodiment of the present invention, in the case where the separation means 23 comprise two gates, opening of the first gate 34 at the outlet 33 of the hot chamber 22 is performed. Then the second gate 40 situated at the inlet of the cold chamber 24 is opened.

During transfer of the load 100 the pressure inside the oven 10 is kept constant by the means, described above, comprising for example the compressor of the hot chamber 22 and the compressor of the cold chamber 24.

The load 100 then enters into the cold chamber 24 where the second conveyor belt 39 arranges it in position.

Once positioning has been performed, the first gate 34 of the hot chamber 22 and the second gate 40 of the cold chamber 22 are closed in the manner described above. At this point it is also possible to introduce a new load 100 in the hot chamber 22.

In particular depressurization of the hot chamber is performed in a manner known per se and then the first closing means 30 are opened.

Inside the cold chamber 24, gradual cooling of the load 100 is performed, in the manner described above, until it is cooled to a temperature suitable for the type of polymer material used. The temperature of the load 100 depends on the type of polymer material used and the type of glass which forms the sheets.

Once the load 100 has been cooled to a given temperature, extraction of the load 100 is performed. Extraction of the load envisages depressurization of the cold chamber until atmospheric pressure is re-established and then the second closing means 44 are opened.

In one possible embodiment the cycle for heating and the associated cycle for cooling the load 100 have the same duration. In this way the two loads, which are present in the hot chamber 22 and the cold chamber 24, respectively, may be moved at the same time.

It can therefore be understood that the time required for processing of a load is drastically reduced compared to a plant comprising an autoclave.

Moreover, it is evident that the time required for processing of a load 100 is also less than that of plants of the known type which do not use an autoclave since cooling of the sheets is performed in a controlled manner.

Cooling is in fact achieved by means of cooling means 36 inside a dedicated chamber 24 instead of through simple exposure to the environmental conditions.

At the same time it is noted that, considering normal operating conditions, at the end of each cooling cycle, the duration of which may coincide with that of the heating cycle, there is a load 100 which may be moved safely by the plant personnel. For example, it may be immediately prepared for the subsequent packaging and transportation stages. At the end of the cycle, in fact, movement of the load does not involve any problems associated with its temperature.

In an alternative embodiment of the present invention, prior to insertion inside the oven 10, the pre-assembled sheets 12 may be inserted inside a sealed bag (not shown), inside which the vacuum is created. Use of the vacuum bag results in an increase in the pressure to which the pre-assembled sheets 12 are exposed inside the hot chamber 22.

Use of the vacuum bag is recommended, for example, in the processing of sheets with large thicknesses comprising several layers of polymer material or in the case where the pre-assembled sheets 12 are not subject to the pre-lamination step.

The sheets are extracted from the vacuum bag at the outlet from the cold chamber 24.

Figure 5:
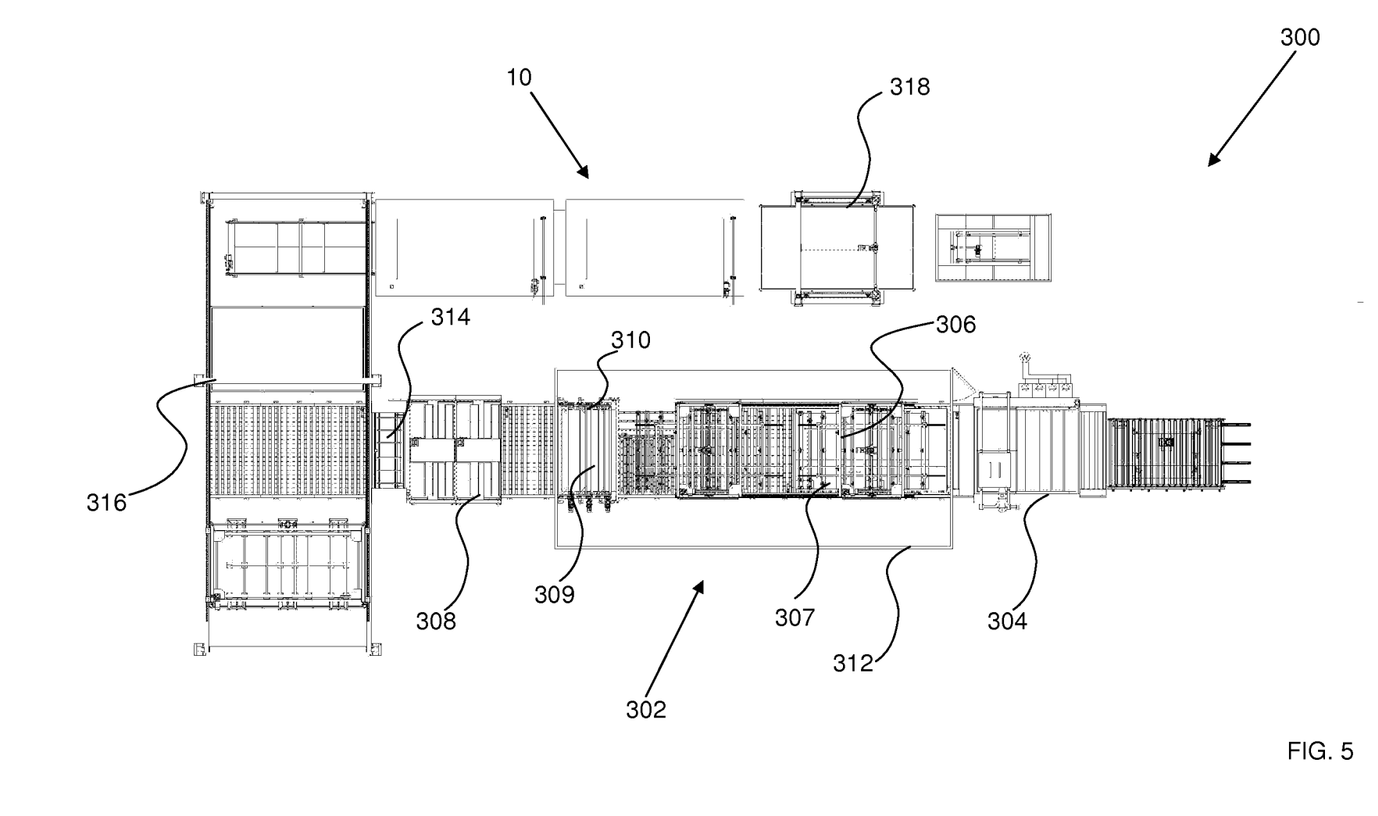
FIG. 5 shows, in schematic form, a plant for the production of laminated glass according to the present invention.

Operation of a plant for the production of laminated glass, comprising an oven 10 according to the present invention, schematically shown in FIG. 5, will now be described in detail.

As already mentioned above, a laminated-glass sheet comprising two sheets of glass 16, 18 and at least one sheet of polymer material 20 is considered below. Obviously the same plant according to the invention may be used to produce multiple-layer laminated-glass sheets, in a similar manner to that described above. Moreover, the same plant may be used for the production of stratified sheets comprising the materials indicated further above.

The plant, denoted overall by the reference number 300, comprises a stratification line 302 and an oven 10 according to the invention.

As is known, the stratification line 302 comprises: a washing apparatus 304, an assembly apparatus 306 and an apparatus 308 for pre-lamination of the sheets of glass 16, 18 and at least one sheet of polymer material 20.

Inside the washing apparatus 304, the sheets of glass 16, 18 are washed with water, brushed and dried in a manner entirely similar to that which occurs in plants of the known type.

In the assembly zone 306, the sheets of glass 16, 18 are assembled with the sheet of polymer material 20. Assembly is performed for example in automated fashion with the aid of mechanical manipulators 307 of the known type. The polymer material 20 is in the form of rolls 309 mounted on an unwinding device 310. The unwinding device 310 allows unwinding of the polymer material 20 and positioning on top of a first sheet of glass 16. Then the manipulator 307 positions a second sheet of glass 18 on top of the sheet of polymer material 20.

Since the positioning operation requires the sheets of glass to have a high degree of surface cleanliness and the polymer material to be kept at given temperature and humidity values, the assembly zone is provided inside an air-conditioned room 312.

The glass sheets 16, 18 assembled with the sheet of polymer material 20 may be transferred to the pre-lamination apparatus 308 where, following heating and compression, the glass sheets 16, 18 and the sheet of polymer material 20 assume a pre-laminated condition.

Heating, to a temperature of about 70-80° C., is generally performed inside an oven by means of infrared lamps. These ovens may also be provided with forced-air convection systems.

After the heating step the glass sheets 16, 18, with the sheet of polymer material 20 arranged in between, pass between two rolling rolls 314 arranged at a predetermined distance from each other.

The combined action of heat and pressure favours initial adhesion between the glass sheets 16, 18 by means of the sheet of polymer material 20.

The pre-laminated sheets 14 thus obtained are arranged in an automated store 316 so as to form a load 100 before introduction inside the oven 10 according to the present invention.

The oven 10 and its mode of operation have been described in detail above and therefore will not be described below.

In an alternative embodiment of the present plant the sheets pre-assembled with the sheet of polymer material are inserted, in a manner known per se, inside a vacuum bag (not shown) and then inserted inside the oven 10.

The advantages due to the use of an oven 10 according to the present invention are therefore evident.

Firstly, with the plant according to the present invention it is possible to achieve a cycle which is more productive from the point of view of both the quantities of laminated-glass sheets produced and the electric power consumption which conditions processing according to the prior art.

In fact, with the oven 10 which has the hot chamber 22 separated from the cold chamber 24 and communicating with the latter only during load transfer, there is no wastage of time or energy due to heating and cooling of the internal structure of the hot chamber 22 of the oven 10.

Secondly it is clear that a semi-continuous cycle for the production of laminated glass is created, where, during normal operating conditions, a load 100 of laminated-glass sheets is produced after each heating cycle. Considering that the time cycle lasts about one hour, with the oven 10 according to the present invention it is possible to produce every hour a load 100 of laminated-glass sheets at a temperature which allows handling thereof under safe conditions.

The cycle times are shorter since, once the hot chamber 22 has reached the processing temperature, this temperature is maintained also for the next cycle. Heat exchange with the exterior is possible only during introduction of the load 100 inside the hot chamber 22.

All the operating time due to pre-heating of the oven 10 and the corresponding excess energy used are therefore eliminated, with significant savings in terms of energy and therefore costs. The excess energy consists of both the abovementioned electric power and the cooling water used to cool the finned units. In fact, in the case of an autoclave, each production cycle requires a quantity of water equivalent to about 150 liters for cooling of the finned units.

Lowering of the temperature of the laminated-glass sheets, which is achieved by means of controlled cooling inside the cold chamber 24, results in thermal processing conditions which are reproducible.

The dimensions of the plant, although the oven 10 comprises a cold chamber 24, are smaller than those of a plant of the known type since the oven 10, which is subject to lower pressures than an autoclave, does not require extra large dimensions. Moreover, the dimensions are also smaller than those of plants of the known type which do not use an autoclave since there is no need to create special spaces for cooling the material soon after processing.

With regard to the embodiments described above, the person skilled in the art may, in order to satisfy specific requirements, make modifications to and/or replace elements described with equivalent elements, without thereby departing from the scope of the accompanying claims.

According to a possible embodiment of the present invention, it is possible to apply advantageously the lamination process described above also to materials other than glass, for example materials chosen from sheets of stone material, stone-like material, PET, polycarbonate or also photovoltaic cells. In particular, the assembled sheets may be of the same type or different type.

For example in the case of production of photovoltaic cells, the stratified sheet comprises: a first sheet of glass, a sheet of polymer material, a photovoltaic cell, a sheet of polymer material and a second sheet of glass.

As will be clear to the person skilled in the art, the processing parameters may vary depending on the type of material which forms the sheets and depending on the polymer material arranged between them.

It is also clear that said values will be substantially the same as for glass, in the case where the sheets are made, for example, of stone or stone-like material.

The load 100 inside the oven 10 according to the invention may be arranged vertically, in a similar manner to that which occurs inside the autoclave or in general inside the ovens of the known art.

Secondly, it is possible to envisage systems for moving the load, different from those described, said systems involving for example the manual handling of the load 100 by workers.

Figure 3A:
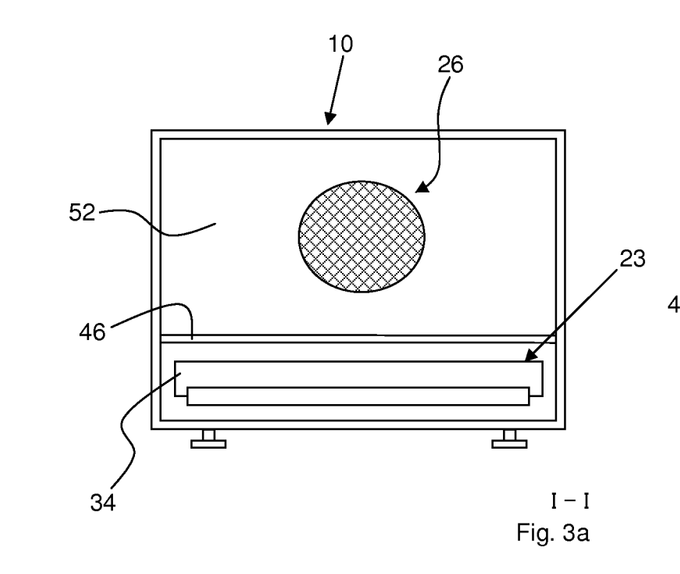
FIG. 3a shows a schematic view of the cross-section I-I of the oven according to FIG. 3.
Figure 3B:
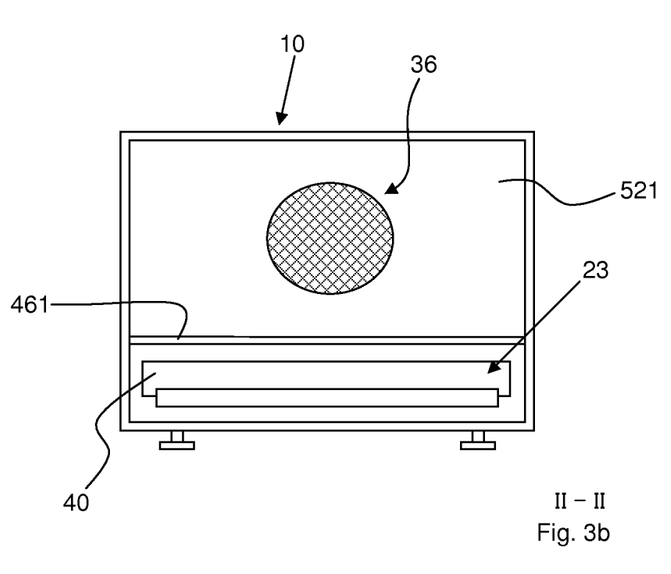
FIG. 3b shows a schematic view of the cross-section II-II of the oven according to FIG. 3.

In the embodiment shown in FIGS. 3a and 3b the oven 10 has a rectangular cross-section, but in alternative embodiments it may have a circular or elliptical form.

The invention claimed is:

1. An oven for producing stratified sheets from pre-assembled sheets, each of the pre-assembled sheets comprising at least two sheets of a first material and at least one sheet of polymer material, the at least two sheets of the first material and the at least one sheet of polymer material being arranged so that the at least one sheet of polymer material is arranged between two facing surfaces of the at least two sheets of the first material, the oven comprising:
a hot chamber comprising a heater, an inlet opening, and a first gate, the first gate for closing the inlet opening, the hot chamber comprising a first chamber pressure between 0.4 and 3 bar above atmospheric pressure during heating;
a cold chamber separated from the hot chamber via a separator, the cold chamber in communication with the hot chamber, the separator comprising a second gate, the cold chamber comprising a cooler, an outlet opening, and a third gate, the third gate for closing the outlet opening, the cold chamber comprising a second chamber pressure between 0.4 and 3 bar above atmospheric pressure during cooling;
a first forced-air circulator in the hot chamber for creating forced-air circulation in the hot chamber and a second forced-air circulator in the cold chamber for creating forced-air circulation in the cold chamber;
wherein the hot chamber and the cold chamber each comprise an inner space divided into a first compartment, a second compartment, and a third compartment in fluid communication, the inner space comprising a dividing wall substantially vertically and a guide wall substantially perpendicular to the dividing wall;
wherein the first forced air circulator comprises a first fan and the second forced air circulator comprises a second fan, the first fan being located on the dividing wall of the hot chamber between an input compartment and a return compartment of the hot chamber, the second fan being located on the dividing wall of the cold chamber between an input compartment and a return compartment of the cold chamber.

2. The oven of claim 1, further comprising a conveyor belt disposed in the hot chamber or the cold chamber.

3. The oven of claim 1, wherein the heater comprises a finned electrical-resistor unit.

4. The oven of claim 1, wherein the cooler is a finned unit supplied with a water tower.

5. The oven according to claim 1, wherein in the cooler comprises a finned unit supplied with ethylene glycol.

6. The oven of claim 1, wherein the hot chamber comprises a first pressurizer for increasing and maintaining a first constant pressure value inside the hot chamber; and the cold chamber comprises a second pressurizer for increasing and maintaining a second constant pressure value inside the cold chamber.

7. The oven of claim 1, wherein the separator further comprises a fourth gate, wherein the second gate separates an outlet opening of the hot chamber from the separator and the fourth gate separates an inlet opening of the cold chamber from the separator.

8. The oven of claim 7, wherein, when the second gate and the fourth gate are in an open position, the hot chamber and the cold chamber are in fluid communication.

9. The oven of claim 1, wherein the first fan circulates air from the first compartment to the second compartment, from the second compartment to the third compartment, and from the third compartment back to the first compartment.

* * * * *